Oct. 19, 1954 J. J. GODBEY 2,692,332
WIDE BAND RECEIVER
Filed April 17, 1946
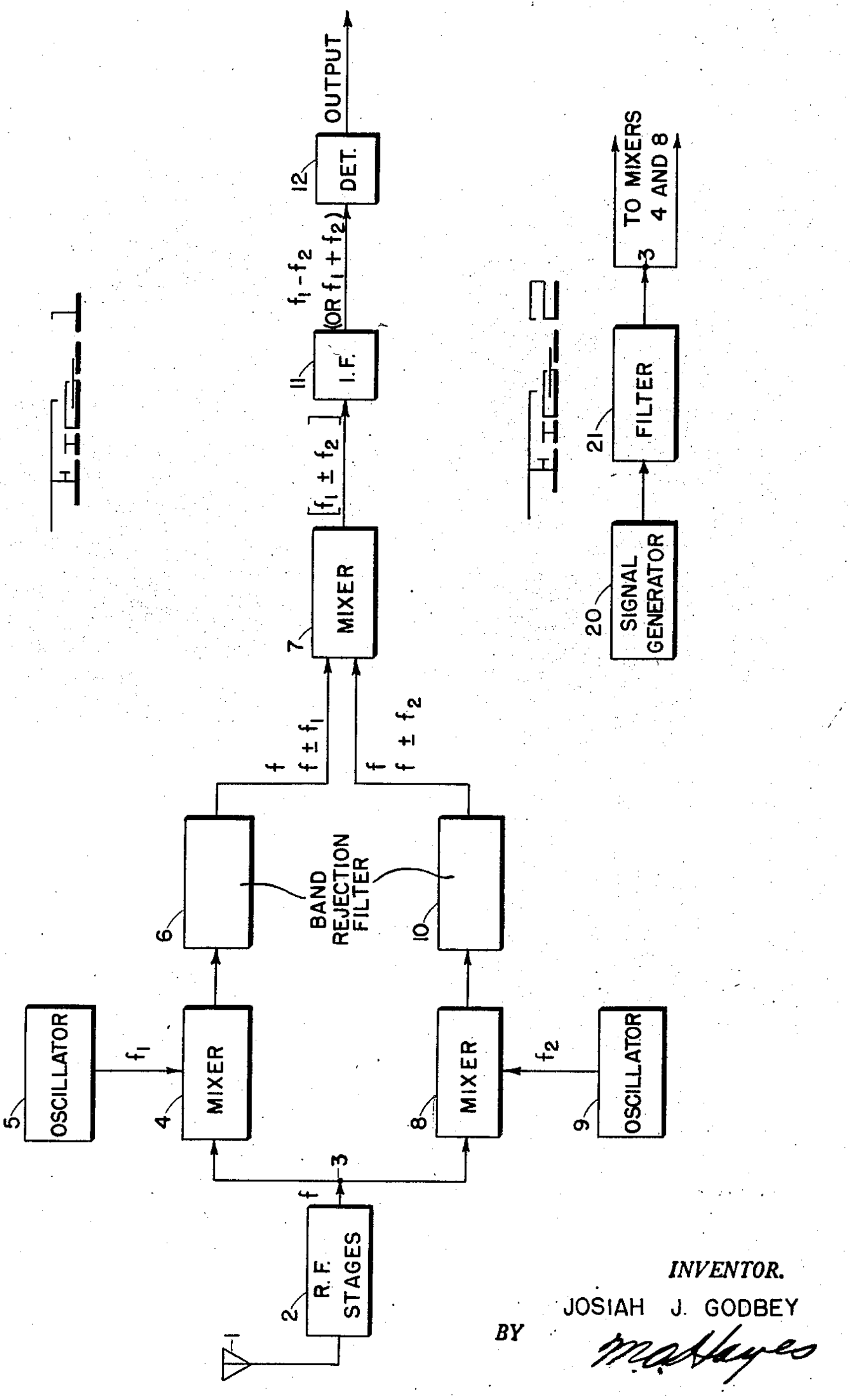
*INVENTOR.*
JOSIAH J. GODBEY
*BY* M. A. Hayes
ATTORNEY Patented Oct. 19, 1954 2,692,332

UNITED STATES PATENT OFFICE 2,692,332

WIDE BAND RECEIVER

Josiah J. Godbey, Dallas, Tex.

Application April 17, 1946, Serial No. 662,770

2 Claims. (Cl. 250—20)

(Granted under Title 35, U. S. Code (1952), sec. 266)

This invention relates in general to a signal amplifying device and particularly to a superheterodyne type of broad-band amplifying-receiving device.

It is well known to the art that if two signals are impressed upon a non-linear device of a nature to receive signals there will result a plurality of signals including signals of frequencies equal to the sum and to the difference of the frequencies of the impressed signals. In electrical apparatus the non-linear device may be an electronic tube or it may be any one of a number of devices employing chemical compounds and arrangements suitable to the purpose.

For many purposes related to the art it is desired to amplify signals over a wide range of frequencies. With the increased use of frequencies extending ever higher, the bandwidths encountered are correspondingly greater and more difficult to amplify uniformly.

If it is desired to receive one frequency at a time in a given band this can be accomplished by the ordinary superheterodyne type receiver in which a local oscillator heterodynes with the incoming signal so that a difference frequency is obtained which is then amplified at an intermediate frequency and detected. There must be provided means to vary the frequency of this local oscillator so that it always differs from that of the incoming stages by an amount equal to the intermediate frequency.

If it is desired to monitor a given bandwidth with such a receiver, it is necessary to constantly sweep the given band with the tuned circuits of the input stages and simultaneously to vary the local oscillator frequency to obtain the given difference frequency.

An object of this invention is to construct a superheterodyne receiver system which enables simultaneous reception of a multiplicity of incoming signals spread over a wide band of frequencies.

Another object of this invention is to provide a superheterodyne receiver system in which a single setting of the local oscillation generating means suffices to produce a fixed intermediate frequency over a wide band of incoming signal frequencies.

Other objects and features of the present invention may be obtained from the following detailed description when taken together with the accompanying drawing, in which:

Fig. 1 is a diagram of an embodiment of this invention.

Fig. 2 is a variant embodiment of this invention.

Referring to Fig. 1, a signal of frequency $f$ is received by an antenna 1 and amplified by one or more conventional radio frequency stages 2 in cascade. The signal output from the R. F. stages 2 is applied in parallel to a pair of mixers 4 and 8 which may be vacuum tubes of the type commonly used to receive a pair of signals of different frequencies for the purpose of frequency conversion. The locally generated signals for frequency conversion are, in the case illustrated, provided by a pair of local oscillators 5 and 9 operating at fixed frequencies and connected respectively to the mixers 4 and 8. The outputs of the mixers 4 and 8 are applied to a pair of filters 6 and 10, respectively and thence to another mixer 7. The output of this last mixer 7 is selectively amplified in an intermediate frequency amplifier 11 and detected in detector 12. All of the components comprising the invention are known to the art; consequently, a detailed description thereof would be superfluous.

To show more clearly what frequencies are present in various parts of the apparatus let it be assumed that the incoming signal is of constant amplitude and of a frequency designated as $f$ and that two frequencies designated by $f_1$ and $f_2$ respectively are supplied by the local oscillators 5 and 9 respectively. Only first-order effects will be considered. There will appear in the output of the upper mixer 4 the applied signals $f$ and $f_1$ and their sum and difference $f+f_1$ and $f-f_1$ The associated filter 6 which may be a parallel resonant filter of the wave trap type is used to reject the local oscillator frequency $f_1$ which in general is sufficiently far removed in frequency from the desired signals $f+f_1$ and $f-f_1$ so that there appear from this channel at an input of the third mixer the signals $f$, $f+f_1$ and $f-f_1$. In a like manner $f$ will beat with $f_2$ in the lower mixer 8 and $f$, $f_2$, $f+f_2$, $f-f_2$ appear in the mixer 8 output. The filter 10 rejects $f_2$ and there appear at an input to the third mixer 7 the frequencies $f$, $f+f_2$, and $f-f_2$ from the second channel. The six signals from the two channels then beat in the third mixer 7 and give $f_1+f_2$ and $f_1-f_2$ as two of the resulting beat frequencies. One of these, $f_1-f_2$ say, is selected and amplified by an intermediate frequency channel 11 which in general has sufficient selectivity to pass only the desired signal and to reject all others. From this point on, the signal is treated as it would be in any receiver of like frequency commonly encountered in the art. The signal may be detected in detector 12. Since the filters 6 and 10 prevent the local oscillator signals $f_1$ and $f_2$ from appearing at the input to the third mixer 7, the output of said mixer 7 will contain $f_1+f_2$ and $f_1-f_2$ only when $f_1$ and $f_2$ are each combined with $f$ in the input signals to said mixer 7. Thus it is evident that a signal is present in the intermediate frequency stages only when an external signal is introduced at the input of this apparatus, and that such inermediate frequency signal is equal to the sum or difference frequency of the said two local oscillators, and further that it is independent of the frequency of the incoming signal.

An amplitude modulated wave can also be detected by this apparatus. If the amplitude of the incoming signal $f$ is varied, the amplitude of the signals of combination frequencies produced in the mixers 4 and 8 will vary accordingly, since in mixers such as these which employ a non-linear characteristic to obtain the combination signals, the strength of such combination frequencies is proportional to the product of the strengths of the components of such signals. Thus, as the strength of the signal $f$ varies with modulation, the strengths of $f+f_1$ and $f-f_1$ vary in the output of the upper mixer 4 and the strengths of $f+f_2$ and $f-f_2$ vary in the output of the lower mixer 8. In a like manner, the strengths of $f_1-f_2$ and $f_1+f_2$ in the output of the third mixer 7 vary as their components, the above $f\pm f_1$ and $f\pm f_2$, vary. This variation is detected by the detector 12 and passed on to the output.

This invention can be adapted to a number of uses. The radio frequency stages 2 may be fix tuned and adjusted to pass a given band it is desired to monitor. Then, the presence of any transmitted signal in that band will be made known by this invention without the necessity of tuning through the band. In addition to detecting steady signals which are easily detected by an ordinary receiver, this invention will also detect non-repetitive signals, repetitive signals of short duration, and signals that repeat at irregular intervals, all of which signals would have little chance of being detected by an ordinary receiver even if it were being continuously tuned through a band.

Additionally, this invention is invaluable to the rapid and easy testing of certain circuit components that may have frequency conscious characteristics such as band pass filters. Suppose, for example, that it is desired to test the characteristics of a wide range radio frequency filter. A usual method would be to place the filter between a signal generator and a radio receiver. Most receivers do not have a constant amplification over any considerable range of frequency—rather, this amplification varies considerably over a given band of the receiver and also from band to band, so that it would first be necessary to accurately calibrate the receiver. Also it would be necessary to tune the receiver for every measurement, that is, for very setting of the signal generator. With this invention all this tediousness and inaccuracy are eliminated as is shown in Fig. 2 to which reference is now made by simply placing the filter 21 between a signal generator 20 and the invention and obtaining continuous readings of frequency versus attenuation. In this case, no tuned radio frequency stages would be used, but rather the signal from the filter would be connected directly to the input of the mixers 4, 8 at a point such as the junction 3.

While certain preferred embodiments of this invention have been described, it is realized that many modifications and variations of this invention may be made. Reference therefore will be had to the appended claims for a definition of the limits of the invention.

The invention described herein may be manufactured and used by or for the Government of the United States of America for governmental purposes without the payment of any royalties thereon or therefor.

What is claimed is:

1. Apparatus for receiving signals varying in frequency over a wide band width comprising a first local oscillator for generating signals of a first fixed frequency, a first frequency converter for mixing said first local oscillator signals and said received signals, first band rejection filter means fed by the output of said first converter arranged to substantially eliminate only those signals of said first fixed frequency, a second local oscillator for generating signals of a second fixed frequency, a second frequency converter for mixing said second local oscillator signals and said received signals, second band rejection filter means fed by the output of said second converter arranged to substantially eliminate only those signals of said second fixed frequency, a third frequency converter for mixing the output of said first and second frequency rejection means, and frequency selection means for recovering from the output of said third converter signals of either the sum or difference frequency of said first and second fixed frequencies.

2. A radio receiver comprising, a pair of frequency converting means into which the incoming signal is applied in parallel, each of said frequency converting means including a separate local oscillator fixedly tuned to a discrete frequency, a separate band rejection filter means coupled to the output of each frequency converting means tuned to reject only the respective local oscillator frequency from the output of each of said frequency converting means, a signal mixing means coupled to the outputs from said filter means operative to heterodyne the output signals from said filter means, and a frequency selective translation circuit coupled to the output of said signal mixing means tuned to the frequency of one of the heterodyne beat note frequencies of said local oscillator frequencies.

References Cited in the file of this patent

UNITED STATES PATENTS

| Number | Name | Date |
|---|---|---|
| 1,306,170 | Butcher | June 10, 1919 |
| 1,869,870 | Stevenson | Aug. 2, 1932 |
| 2,093,871 | Levin | Sept. 21, 1937 |
| 2,123,221 | Worral | July 12, 1938 |
| 2,416,791 | Beverage | Mar. 4, 1947 |